United States Patent [19]

Jabbari et al.

[11] Patent Number: 5,734,528
[45] Date of Patent: Mar. 31, 1998

[54] DISC DRIVE ACTUATOR INCORPORATING INJECTION MOLDING, FLYING LEADS, AND LOCKING FLANGES

[75] Inventors: Iraj Jabbari; Brian L. Phillips, both of San Jose; Brian T. Bonn, Sunnyvale; Chul Soo Kim, Los Gatos; Michael A. Maiers, San Jose; Mark E. Gauger, San Francisco, all of Calif.

[73] Assignee: Seagate Technology, Inc., Scotts Valley, Calif.

[21] Appl. No.: 622,616

[22] Filed: Mar. 26, 1996

Related U.S. Application Data

[63] Continuation of Ser. No. 280,844, Jul. 26, 1994, abandoned, which is a continuation of Ser. No. 926,168, Aug. 4, 1992, abandoned, which is a continuation of Ser. No. 60,302, May 11, 1993, abandoned, which is a continuation-in-part of Ser. No. 926,168, Aug. 4, 1992, abandoned.

[51] Int. Cl.⁶ .................................. G11B 5/54; G11B 21/08
[52] U.S. Cl. .................................. 360/106; 360/105
[58] Field of Search .................................. 360/105, 106, 360/107, 109; 310/36, 71, 34, DIG. 6, 43

[56] References Cited

U.S. PATENT DOCUMENTS

| | | | |
|---|---|---|---|
| 4,352,897 | 10/1982 | Ogata et al. | 523/220 |
| 5,041,924 | 8/1991 | Blackborow et al. | 360/69 |
| 5,113,297 | 5/1992 | Yoshida | 360/99.06 |
| 5,122,703 | 6/1992 | Takahashi et al. | 310/36 |
| 5,262,912 | 11/1993 | Hudson et al. | 360/105 |

*Primary Examiner*—Stuart S. Levy
*Assistant Examiner*—William R. Korzuch
*Attorney, Agent, or Firm*—Flehr Hohbach Test Albritton & Herbert LLP

[57] ABSTRACT

The present invention provides an improved actuator arm assembly including scalloped locking flanges with indentations for longitudinal, perpendicular, and torsional support, an injection molding for precisely locating and fixing a motor coil bobbin, motor coil wires, magnetic latch striker plate, and a crash stop to an actuator arm. Apertures on the actuator arm allow the plastic molding to pass through and lock the actuator arm to the motor coil bobbin together. The magnetic latch striker plate fixably parks the actuator arm in the disc drive assembly. Locating apertures of various shapes in the motor coil bobbin adds further stability and aids in interlocking the plastic molds around the motor coil bobbin. Furthermore, to reduce the height of the disc drive, protect the lead wires from being unduly stressed during the formation of the mold, and increase wire strength to tolerate stresses during testing and assembly, another embodiment of the invention utilizes insulating sleeves around the lead wires. Thus, after forming the lead coils from a molded coil mounted at the rear of an actuator arm, the two lead wires from either end of the coil are led out from the end of the coil, and plastic tubes are slid over the wires up to a point closely adjacent the wound coil. The wound coil is then molded, fixing its shape and holding it in place on the rear of the actuator arm.

23 Claims, 7 Drawing Sheets

DISC DRIVE ACTUATOR INCORPORATING INJECTION MOLDING, FLYING LEADS, AND LOCKING FLANGES

RELATED APPLICATIONS

This is a continuation of application Ser. No. 08/280,844 filed Jul. 26, 1994, now abandoned, which is a continuation of application Ser. No. 07/926,168 filed Aug. 4, 1992, now abandoned, which is a continuation of application Ser. No. 08/060,302 filed May 11, 1993, now abandoned, which is a continuation-in-part of application Ser. No. 07/926,168 filed Aug. 4, 1992, now abandoned.

BRIEF SUMMARY OF THE INVENTION

This invention relates generally to the field of disc drive actuators, and more particularly to an improved actuator arm assembly, means for attaching a motor coil to an actuator arm, and improved means for providing electrical connections to a rotary disc drive actuator.

BACKGROUND OF THE INVENTION

The present invention provides an improved actuator arm assembly including scalloped locking flanges and molding means utilizing injection molding to form a crash stop and for precisely locating and fixing a motor coil, motor coil wires and magnetic latch striker plate to an actuator arm. Furthermore, the present invention comprises a method and apparatus for reliably forming the electrical connections between the actuator arm assembly in a disc drive and the control circuits which are mounted elsewhere in the disc drive.

In general, a disc drive contains one or more information storage discs capable of magnetically storing information. The discs are rotated by a spindle motor mounted at the center of the disc or discs. The information is read and written to specific locations on the disc using magnetic transducers commonly known as read/write heads that fly above the disc surface. Head positioning apparatus is provided in the form of an actuator arm assembly.

The actuator arm assembly consists of a substantially triangularly-shaped actuator arm. Traditionally, the arm is constructed from a low mass material such as cast aluminum. The arm is designed to pivot about a centrally-located pivot bore. The bore cooperates with a bearing system surrounding a fixed shaft enabling the arm to pivot smoothly about the shaft.

At one end of the actuator arm is attached a means for moving the arm about the shaft. In rotary motion actuators of the type incorporating the present invention, the motion is accomplished by a moving coil magnetic motor having the motor coil assembly attached to the actuator arm. Wires are attached to the motor coil assembly for passing selected control signals, resulting in the movement of the actuator arm about the shaft.

The actuator arm will move frequently and rapidly from position to position over the surface of the disc. As disc drives become smaller and smaller, the wires which form the coil in the actuator arm and which lead out from the coil to receive the control signals become increasingly fine. Such small disc drives are expressly designed for incorporation into portable or notebook size computers, which are frequently carried, moved about, and subjected to significant shocks. Therefore, it is an object of this invention to provide a method of providing the lead wires into the coil which are capable of withstanding significant shocks during the lifetime of the disc drive.

To limit the movement of the actuator arm in the final disc drive assembly, manufacturers incorporate crash stops and parking mechanisms. A crash stop prevents the actuator arm, and necessarily the magnetic transducers (read/write heads), from traveling beyond the edge of the information storage discs. A parking mechanism locks the actuator arm at a fixed location upon power off, to allow the user to safely move the disc drive as required. In the prior art, the actuator arm may be fitted with a crash stop assembly to limit arm motion. Typically, the crash stop assembly comprises a crash stop flange extending from each side of the crash stop assembly and is formed from molded molten thermoplastic resin. A magnetic latch striker plate may be fixably attached to one of the crash stop flanges to be utilized during disc parking operations.

The technology for manufacturing the actuator arm assembly presently utilizes a bonding method whereby the metal portion of the actuator arm is fixably bonded to the motor coil by the use of a resin or adhesive. This arm-coil sub- assembly is then bonded to the crash stop assembly also by use of a resin, thereby forming the actuator arm final assembly. These bonding processes are performed manually, are extremely difficult and necessarily time consuming.

While the utilization of injection molding for fixably attaching a motor coil to an actuator arm is known in the art (see Takahashi et al., U.S. Pat. No. 5,122,703 and Umehara et al. U.S. Pat. No. 5,168,184), problems in the injection molding processes have surfaced. First, as the mold pieces are utilized and necessarily wear, the separation lines formed when the molding pieces are joined tend to widen over time. As the gaps widen, flash will result as the molten thermoplastic resin compound is injected into the mold, necessitating a cleansing operation to remove the flash from the finished products or a resin overcoat to keep the flash from falling off.

Secondly, the thermoplastic resins utilized in the molding processes do not bond to the finished actuator arm metallic surfaces, requiring further support means as evidenced in Takahashi et al. and Umehara et al. However, as disc drive technology continues to seek thinner and smaller overall packages, the embedded finger support system of the prior art presents finite limits as to how thin the support fingers and top and bottom thermoplastic overcoat layers may be while remaining functional.

In the manufacturing process, dimensional tolerances less than 0.020 inches must be maintained as the motor coil assembly is bonded to the actuator arm to prevent the short circuiting of the motor coil wires with the aluminum body of the actuator arm. In the prior art, this has been accomplished through a terminal block separately bonded to the motor coil and actuator arm body. The terminal block serves to support the motor coil wires, and to electrically connect the wires to extension pins for passing the control signals to a printed circuit board within the disc drive. Additional tolerances of less than 0.004 inches must be maintained while fixably locating the motor coil extension pins in preparation for soldering to the printed circuit cable interface. The resultant structure leaves the motor coil wires, extension pins and the wire/pin interface exposed and vulnerable to damage and short circuiting. The dimensional requirements and exposed wire configuration have resulted in costly tooling and poor overall yields in the production process, often necessitating rework or scrapping deficient hardware.

As cost is becoming increasingly critical in being competitive in the disc drive market, the fewer the components and processes involved in the assembly of disc drive, the lower the overall costs.

As the actuator arm assembly design is contemplated, the dynamics of the actuator arm relative to the pivot bore necessitate the overall center of gravity of the actuator arm assembly must be maintained centered over the pivot bore. If this consideration is not accounted for in the selection of materials for the actuator arm assembly, damage to the information storage disc or data corruption may occur during shock or vibration. One skilled in the art would recognize that as the center of gravity moves away from the pivot bore, a lever arm will form, magnifying any shock to the unit. As a result, the actuator arm assembly and attached read/write heads may jump to a different track(and if during a write cycle, write over an incorrect location destroying any data present) or worse, strike the information storage disc.

Further, as disc drives become smaller in size, the height of the disc drive becomes a crucial factor, and every element of mechanical structure which can minimize the height of the drive must be addressed. It is therefore an object of the present invention to provide a method for structuring the lead wires to a coil of a disc drive so that a minimal amount of height is utilized.

The technology for forming the coil in a rotary actuator arm in a moving coil magnetic motor presently utilizes molded coils. That is, after the metal portion of the actuator arm is formed, the coil is wound and then molded onto the rear of the arm using a plastic mold which forms a plastic piece which surrounds the coil and also attaches the coil to the arm.

OBJECTS AND SUMMARY OF THE INVENTION

An object of the present invention is to provide an improved actuator arm assembly utilizing injection molding for fixably attaching the coil motor assembly to the actuator arm.

Another object of the present invention is to provide an improved actuator arm assembly utilizing an injection molding process and apparatus for minimizing flash during the attachment of a motor coil assembly to an actuator arm.

A further object of the present invention is to provide an improved actuator arm assembly including scalloped locking flanges and molding means utilizing injection molding for fixably attaching the motor coil assembly to the actuator arm.

Still a further object of the present invention is to provide a method for manufacturing an actuator arm assembly including precisely locating and fixably attaching the coil motor and coil motor wires to the actuator arm.

Still yet another object of the present invention to provide a method and apparatus for achieving an actuator arm assembly eliminating the separate piece part crash stop assembly (and necessarily the resultant bonding process) by utilizing injection molding for forming of the crash stop assembly in an actuator arm assembly.

A further object of the present invention is to provide an actuator arm assembly with a center of gravity at the pivot bore.

Another object of the present invention is to provide an apparatus and method for attaching the coil and the leads leading out from the coil to the rear of the actuator arm which minimizes the height of the molded coil and leads, and allows for easy reworking of the coil portion of the moving coil magnetic motor in the event of a structural failure.

In summary, the present invention is intended to provide a method and apparatus for achieving an improved actuator arm assembly in a disc drive. More specifically, the present invention provides an improved actuator arm assembly including scalloped locking flanges and injection means utilizing injection molding for precisely locating and fixing a motor coil, motor coil wires and magnetic latch striker plate to an actuator arm. Additionally, the invention also provides a method and apparatus for achieving a low profile molded coil for a rotary actuator arm. More specifically, the present invention provides a very low profile lead connection from a rotary actuator arm molded coil for the leads which must be let out to provide control signals to the coil.

The invention further provides a simplified method and apparatus for forming and fixably attaching a crash stop to a motor coil in an actuator arm assembly.

The present invention comprises a method for forming a unique molded coil structure for an actuator arm. The molding process is as follows. An actuator arm is provided with locking flanges. A motor coil bobbin assembly with locating apertures is provided comprising motor coil wires wound on a bobbin with extended lead wires fixably attached to a terminal block with extension pins. A magnetic latch striker plate, tooling block, top molding block and bottom molding block with guide pins are provided.

The motor coil bobbin assembly is joined onto the tooling block, allowing the extension pins to extend into small apertures in the tooling block. The tooling block is then placed into a bottom molding block, fixably and precisely locating the motor coil via the locating apertures and guide pins, while the tooling block apertures protect the exposed ends of the extension pins. The actuator arm and magnetic latch striker plate are then placed in the bottom molding block. A top molding block is then superimposed over the bottom molding block. A molten thermoplastic resin compound is injected into the mold thereby forming a crash stop while also fixably attaching the motor coil bobbin assembly and magnetic latch striker plate to the actuator arm.

For the lower profile disc drive embodiment of the present invention, the lead coils are formed from a molded coil mounted at the rear of an actuator arm wherein after the coil is wound, the two lead wires from either end of the coil are let out from the end of the coil and plastic tubes are slid over the wires up to a point closely adjacent the wound coil. The wound coil is then molded, fixing its shape and holding it in place on the rear of the actuator arm. The teflon tubes protect the leads from being unduly stressed during the forming of the mold, and increased the wire strength so that the coil and mold can tolerate handling stresses during testing and assembly.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Figure 1:
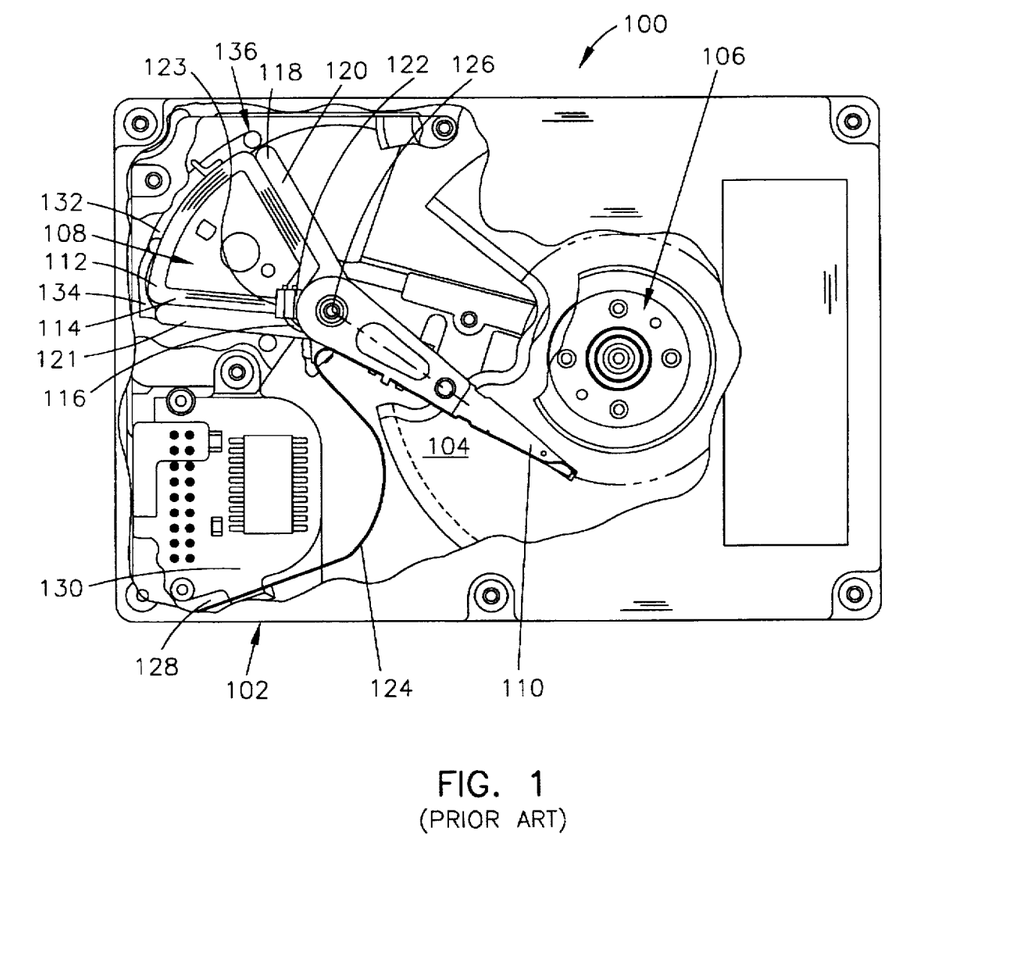
FIG. 1 shows a cutaway view of a disc drive assembly with a typical actuator arm assembly found in the prior art.

Referring first to FIG. 1, there is shown a cutaway view of a typical prior art disc drive structure. A disc drive 100 includes a casing 102 surrounding the information storage disc 104 and the centrally located spindle motor 106. The spindle motor 106 supports the information storage disc 104 for rotation. Also within the casing 102 is the actuator arm assembly 108 having a read/write head assembly 110 mounted at one end. At the opposing end of the actuator arm assembly 108 is the magnetic motor coil actuator motor 112, including motor coil bobbin 114 for moving the head assembly 110 to the desired location on the information storage disc 104.

Thin motor coil wires 116 extend from the motor coil bobbin 114 which is bonded on the rear of the actuator arm 118 on to actuator arm flanges 120 and 121. A terminal block 123 with extension pins 122 is fixably attached to the motor coil bobbin 114 by use of a resin. The thin motor coil wires 116 are fixably and electrically attached to the end of the extension pins 122 on the terminal block 123 by soldering.

Printed circuit cable (PCC) 124 attaches to the extension pins 122 near to the actuator arm assembly's pivot point 126. The PCC 124 arcs away from the actuator arm assembly 108 (where it is connected to the extension pins 122) toward a rigidly mounted printed circuit connector 128 on the printed circuit board 130.

A crash stop assembly 132 including crash stop flange 134 and magnetic latch striker plate 136 is attached to the motor coil bobbin 114 on the rear of the actuator arm 118, forming the completed actuator arm assembly 108.

Figure 2A:
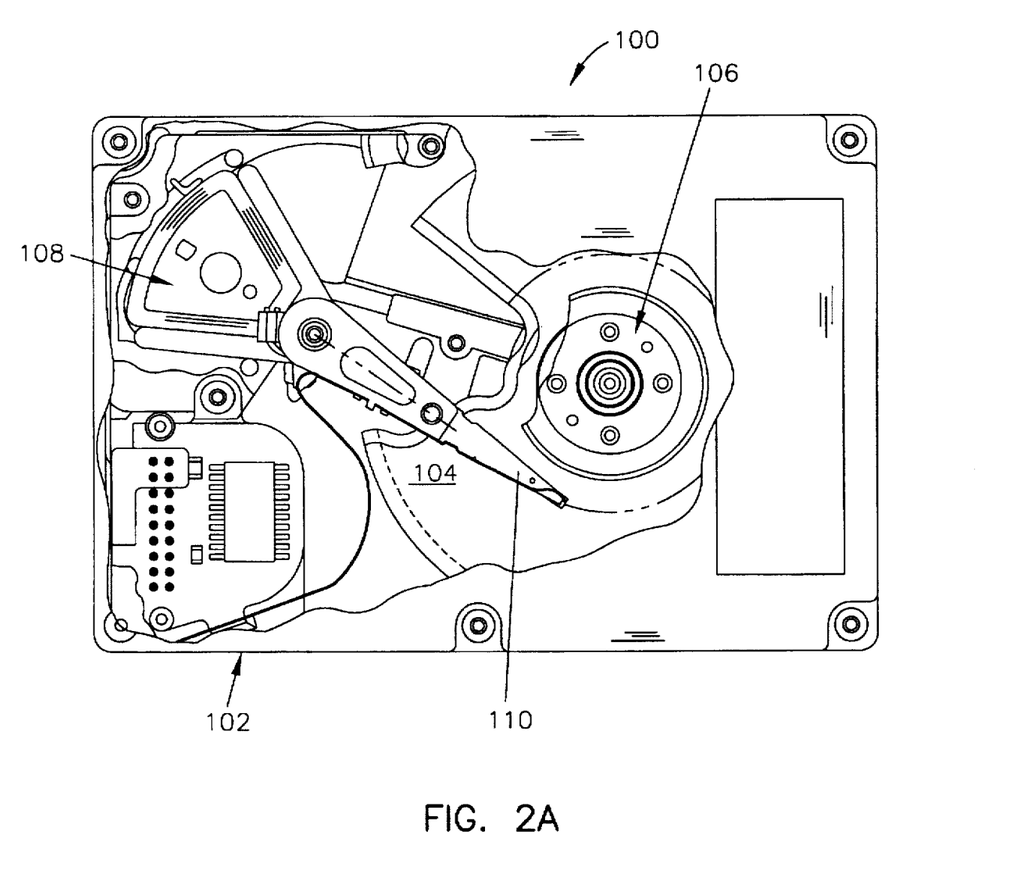
FIG. 2A shows a cutaway view of a disc drive assembly incorporating the preferred embodiment of the present invention.

Referring now to FIGS. 2A–2D, the structure of the present invention resulting from the injection molding process will be shown. In FIG. 2A, the same disc drive 100 includes a casing 102 surrounding an information storage disc 104, spindle motor 106 and actuator arm assembly 108 with read/write head assembly 110 attached.

Figure 2B:
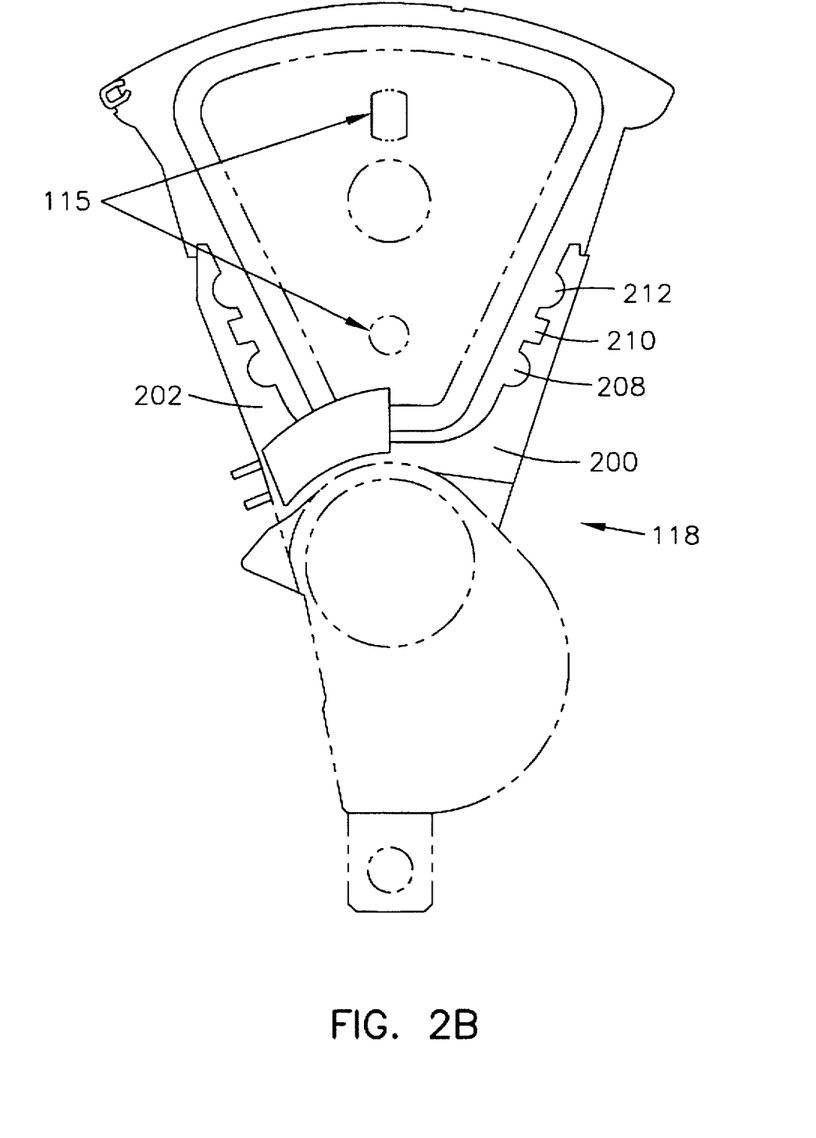
FIG. 2B is a detailed view of the actuator arm in the preferred embodiment of the present invention.

Referring, now to FIG. 2B, actuator arm 118 includes complementary locking flanges 200 and 202. Unlike the smooth, contoured and longer actuator arm flanges 120 and 121 shown in FIG. 1, each locking flange 200 and 202 contain top and bottom surfaces with molded cutouts, or indentations 208, 210 and 212. In the preferred embodiment, the actuator arm 118 is formed by casting aluminum, with the cutouts formed by protrusions in the molding blocks.

Those ordinarily skilled in the art Will recognize the actuator arm may be formed by other means as is known in the art, such as metal injection molding, or from other materials, such as stainless steel. In the preferred embodiment the cutouts are semi-circular shape of approximately 0.062 inches in diameter and trapezoidal shape with a height of 0.040 and width of 0.030 inches, and extend to a depth of approximately 0.015 inches in the locking flanges 200 and 202. Those of ordinary skill in the art will recognize that the size and shape of the cutouts merely provide additional surface area to assist in the locking function, and therefore may be varied as required and are in no way limiting. Thus, the flanges can have a plurality of indentations disposed in the flange top and bottom surfaces with openings extending to the interior facing surface. Additionally, the indentations can be circular, trapezoidal, or rectangular in shape. Furthermore, the indentations disposed in the top surface with interior facing openings can be offset from the indentations with interior facing openings in the bottom surface. Also, the indentations disposed in the top and bottom surfaces with interior facing openings can have a depth of from 1/10th to 1/2 of the thickness of the flange.

Figure 2C:
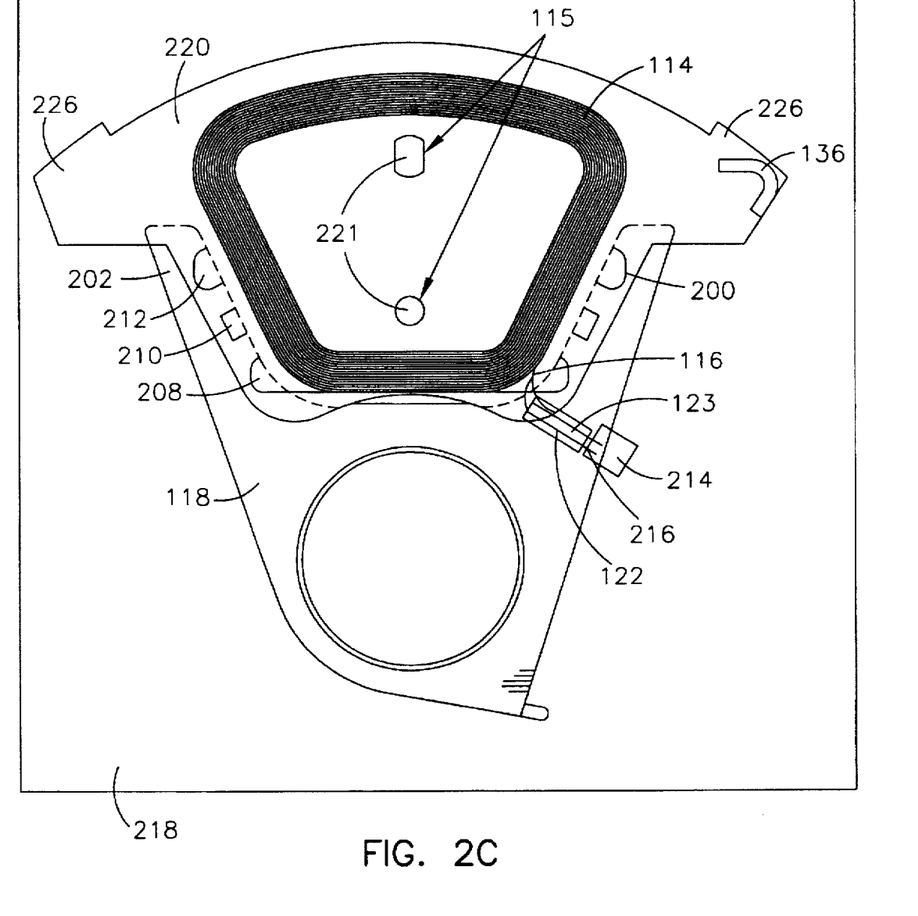
FIG. 2C is a detailed view of a portion of the actuator arm assembly in the preferred embodiment of the present invention during the manufacturing process.

Referring now to FIG. 2C, according to the process for forming the completed end of the actuator arm assembly which supports the motor coil bobbin 114, a motor coil bobbin 114 is provided with locating apertures 115. In the preferred embodiment the locating apertures 115 are of circular and rounded rectangular shape. The motor coil bobbin 114 is first wound as is known in the art with motor coil wires 116 left extending. The thin motor coil wires 116 are fixably and electrically attached to the end of the extension pins 122 on the terminal block 123 by soldering or other means as is known in the art. The terminal block 123 is temporarily attached to the motor coil bobbin 114 by use of a resin. Those ordinarily skilled in the art will recognize that the bond of the terminal block to the motor coil bobbin only requires a temporary fixation. The permanent installation of the terminal block will be accomplished by the injection molding process hereinafter described.

The extension pins 122 and attached motor coil bobbin 114 are joined onto a tooling block 214, allowing the extension pins 122 to extend into small apertures 216 in the tooling block 214. A bottom molding block 218 with molding cutout 220 and guide pins 221 is provided. In the preferred embodiment the guide pins 221 are cylindrical and rounded rectangular in shape and extend outward from the bottom of the bottom molding block 218. The tooling block 214 and joined motor coil bobbin 114 are then placed into the bottom molding block 218 by aligning the guide pins 221 with the locating apertures 115, thereby fixably and precisely locating the motor coil bobbin 114 and extension pins 122.

The actuator arm 118 with locking flanges 200 and 202 is placed in position in the bottom molding block 218 along with magnetic latch striker plate 136 relative to the tooling block 214 and motor coil bobbin 114. A top molding block 222 (not shown)is then superimposed over the bottom molding block 218.

Figure 2D:
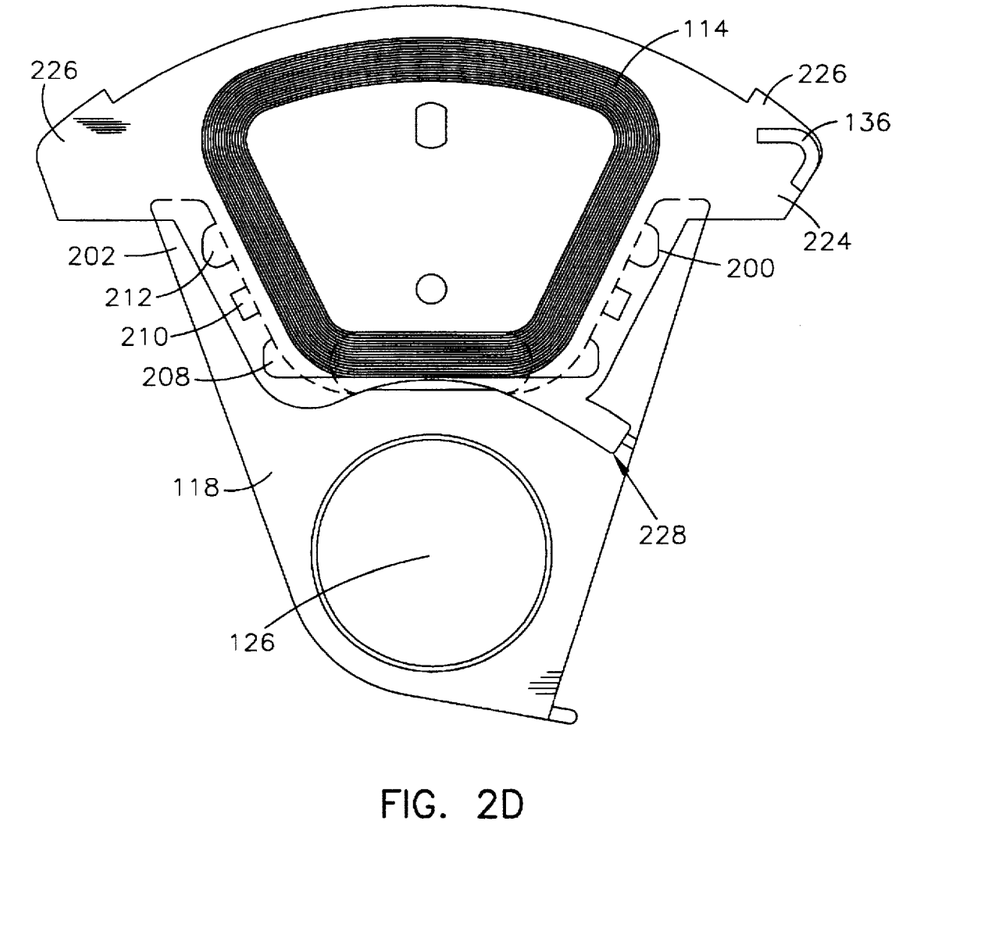
FIG. 2D is a detailed view of the plastic mold formed by the injection molding process of the present invention.

Referring now to FIG. 2D, a molten thermoplastic resin compound is injected into the mold by injection molding methods, then allowed to cool, thereby forming a plastic mold 224. The plastic mold 224 serves to fixably attach the motor coil bobbin 114 and magnetic latch striker plate 136 to the actuator arm 118 while fixing the orientation of the motor coil wires 116 and extension pins 122 (shown in FIG. 2C) and maintaining their separation from the body of the actuator arm 118. Those ordinarily skilled in the art will recognize that the locking flanges 200 and 202 with cutouts 208, 210 and 212 provide longitudinal, perpendicular and torsional support about the plastic mold/locking arm interface. Additionally, those ordinarily skilled in the art will recognize the uneven facing surface of the motor coil bobbin provides a similar function along the plastic mold/motor coil interface.

The injection molding process is well known in the art, and no unique or unusual process steps are involved for the preferred embodiment of this invention. In the preferred embodiment, a 15 percent glass filled, fire retardant polyphthalamide resin (PPA) with a flexural modulus of $1.2 \times 10^6$ psi is utilized. The glass filled thermoplastic resin adds better flash properties for the molding process selected, taking into account the minimal practical tolerances which can be achieved between the parts and the respective molding blocks. Additionally the support structure of the present invention allows thermoplastic resin selection with 15 percent less rigidity than that of the prior art (flexural modulus of $1.2 \times 10^6$ psi as compared to $1.42 \times 10^6$ psi), thereby creating a molded structure that is markedly less brittle, more reliable and easier to handle in post production processing. Other thermoplastic resins may be substituted as is known in the art.

Those of ordinary skill in the art will recognize the selection of materials (thermoplastic resin, for the molding process) must be accomplished in view of the relative melting points of the components within the mold in order to assure component integrity throughout the process. Additionally, those ordinarily skilled will recognize that the materials selected and the size of the mold 224 must be accomplished so as to maintain the overall center of gravity of the actuator arm assembly 108 at the actuator arm assembly pivot point 126. Movement of the center of gravity outside of the pivot point 126 may result in damage to the information storage disc 104 in the event of shock to the disc drive 100. In the preferred embodiment the thermoplastic resin utilized is Amodel AF-1115 VO with a melting point at 590° F., and a specific gravity of 1.58.

Figure 3A:
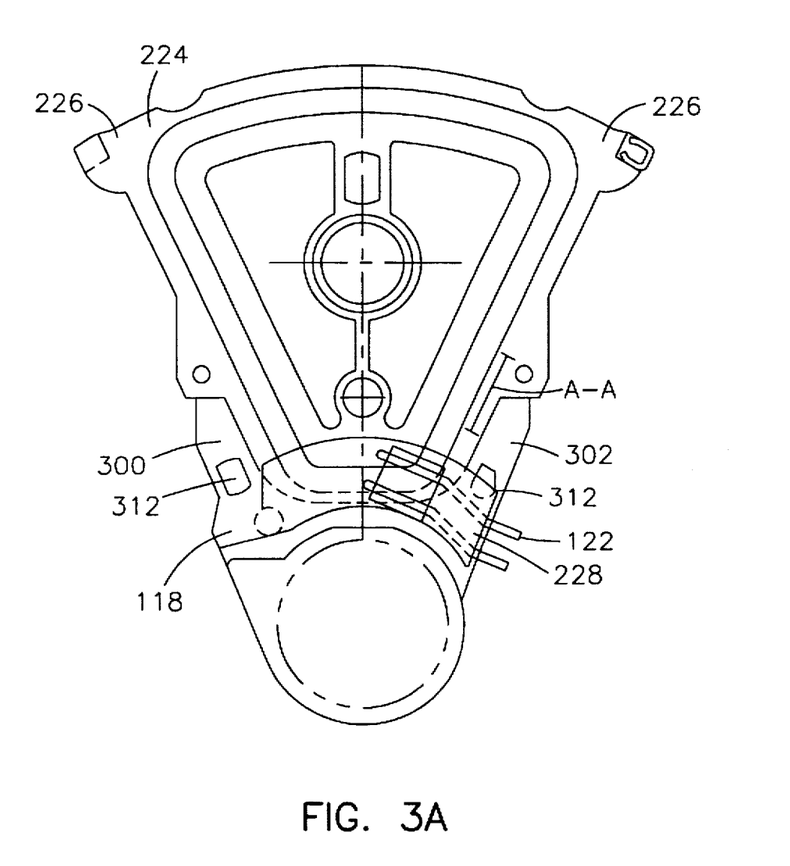
FIG. 3A is a detailed view of an alternate embodiment of the present invention with the plastic mold formed by the injection molding process of the preferred embodiment of the present invention.

The plastic mold 224 includes a molded crash stop 226 (or "finger" as shown in FIGS. 2C, 2D, and 3A) and molded terminal guard 228 formed in the injection molding process. The molded crash stop 226 replaces the separate crash stop assembly 132 (shown in the prior art of FIG. 1) and thereby eliminates the bonding processes of the prior art as shown in FIG. 1. Those ordinarily skilled in the art will recognize the benefits of a molded crash stop as threefold; eliminating actuator arm assembly process steps, extra parts, as well as an improvement over the resin bonding process for fixably attaching the motor coil 114. The molded terminal guard 228 serves to protect (post processing) the motor coil wires 116, extension pins 122 and wire/pin interface by fixably enclosing said items within the plastic mold (see FIG. 2C). Additionally, in the preferred process for injecting the thermoplastic resin, injection gates (the location where the thermoplastic resin is input into the mold) are located on the far side of the mold so as to put the coil wires 116 and extension pins 122 in the least harsh molding environment, thereby preventing short circuiting or damage of the wires and pins in the injection process.

Figure 3B:
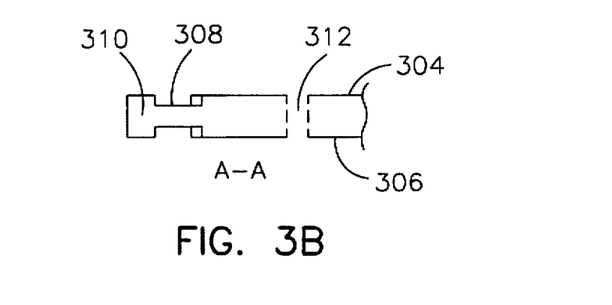
FIG. 3B is a cutaway view of the actuator arm locking flange in an alternate embodiment of the present invention.

Referring now to FIG. 3A, in an alternate embodiment of the present invention, actuator arm 118 comprises locking flanges 300 and 302. Each locking flange 300 and 302 contain top and bottom surfaces 304 and 306 with complementary molded cutouts 308 as shown in FIG. 3B. Additionally locking flanges 300 and 302 include a locking flange end tab 310 and locking flange aperture 312.

In the alternate embodiment, the actuator arm 118 is formed by casting aluminum, with the cutouts, aperture and tabs formed by protrusions in the molding blocks. Those ordinarily skilled in the art will recognize the actuator arm may be formed by other means as is known in the art, such as metal injection molding, or from other materials, such as stainless steel. In this embodiment, the end tab 310 is cylindrical in shape of 0.028 inches in diameter while the aperture 312 extends through the body of the locking flanges 300 and 302 and is of a diameter of 0.050 inches. Those of ordinary skill in the art will recognize that the size and shape of the cutout and tabs merely provide additional surface area to assist in the locking function, and therefore may be varied as required and are in no way limiting. Additionally, those skilled in the art will recognize that the radius of the aperture 312 is not restricted, however the existence of the aperture improves the locking of the plastic mold 224 to the actuator arm 118.

Figure 4:
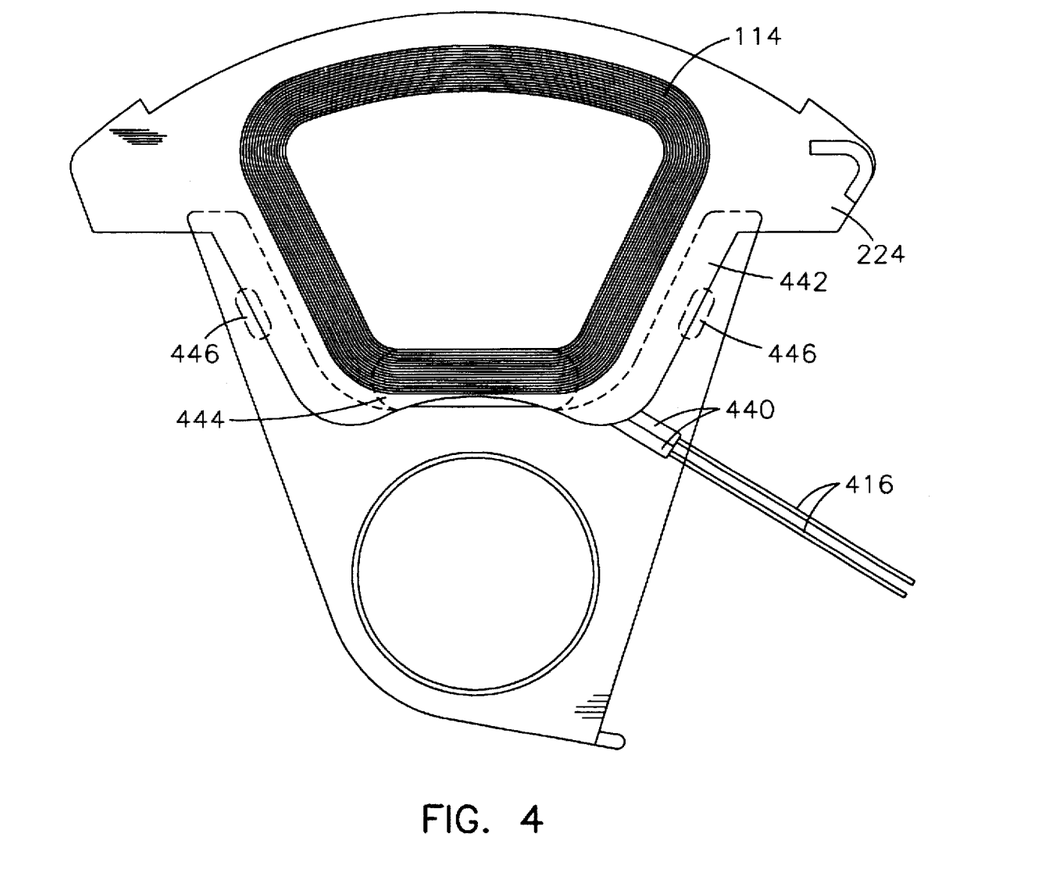
FIG. 4 is a top plan view of another embodiment of the present invention showing the flying leads with insulating sleeves.

In another embodiment of the present invention, the height of the disc drive is reduced by not employing mounting block 123 (shown in FIG. 2C) and using flying leads with teflon (tetrafluoroethylene or a polymer thereof, polytetrafluoroethylene) sleeves. As shown in FIG. 4, the motor coil 114 is first wound, with the wire leads 416 left extending out together to one side of the coil rather than being cut off short. Sleeves 440 of an insulating material of some strength such as Teflon to resist being crushed are then slid over these two wires 416. The Teflon sleeves 440 slide up to the point where the wires join the wound coil. The coil is then placed in the mold and the plastic mold 224 is formed over the entire coil and, as shown in FIG. 4, underlying a region of the actuator arm in the region 442 and overlying a portion of the actuator arm at the area 444. The lead wires 416 are then connected to the PCC 124 (shown in FIG. 1) near the actuator arm pivot point. Two pins of the plastic material 446 extend up through the actuator arm and hold the plastic molding with the coil it supports in place. Should some defect in the magnetic voice coil motor be found, the molded coil can easily be removed from the actuator arm and replaced by cutting off the pins and pushing the molded voice coil piece 224 away. As the molding is being formed over the coil, the Teflon sleeves protect the extended wires so that the press which forms and defines the mold over the coil does not deform, crimp or bend the wires 416. In addition to protecting the leads during the forming of the coil supporting mold, these Teflon tubes increase the wire strength so the overmold coil can tolerate handling stresses during testing and assembly.

While the present invention has been described with reference to a specific embodiment, the description is illustrative of the invention and is not to be construed as limiting the invention. For example, other materials than Teflon may be of suitable strength and reliability to perform an equivalent function. Further, the coil molding technique does not require a specific material or form. Various other modifications may occur to those skilled in the art without departing from the true spirit and scope of the invention as defined in the claims.

We claim:

1. A disc drive assembly comprising:
    a spindle motor assembly for supporting and rotating a disc;
    an actuator arm for supporting a transducer having two complementary flanges at an end region, the end region located near a voice coil motor assembly;
    the voice coil motor assembly for moving the actuator arm assembly;

motor control electronics having a printed circuit cable for transmitting control signals to the voice coil motor assembly and data signals to the transducer; and a coil portion located at the end region of the actuator arm substantially between the complementary flanges including, a single wire wound in a prescribed shape and having input and output leads extending away from said coil portion, and interfacing means including individual tubes of insulating and reinforcing material over each of said input and output leads in regions extending from closely adjacent said coil portion to an edge of one of said complementary flanges distal from said coil portion, said individual tubes to allow for direct connections between said coil portion input and output leads and said printed circuit cable, to protect said input and output leads from unnecessary flexing during testing and assembly of said actuator arm, to insulate said input and output leads from each other, and to minimize the height of the disc drive, and a molded piece surrounding and supporting said coil portion in a defined shape, said molding piece attaching said coil portion to said complementary flanges of said actuator arm to hold said coil portion in place, said molded piece extending at least partially over said insulating and reinforcing tubes for said input and output leads, and wherein said molded piece extends over said flanges of said actuator arm.

2. A disc drive as in claim 1 wherein said insulating and reinforcing material is polytetraflouroethylene.

3. A disc drive assembly as claimed in claim 1, wherein said flanges are provided with fixing means integral to top, bottom, and interior facing surfaces to prevent said actuator arm from being detached from said motor coil bobbin.

4. A disc drive assembly as in claim 3 wherein said fixing means comprise a plurality of indentations disposed in said flanges top and bottom surfaces with openings extending to said interior facing surface, said indentations to provide longitudinal, perpendicular and torsional support to prevent said actuator arm from being detached from said motor coil bobbin.

5. A disc drive assembly as in claim 4 wherein said indentations are circular in shape.

6. A disc drive assembly as in claim 4 wherein said indentations are trapezoidal in shape.

7. A disc drive assembly as in claim 4 wherein said indentations are rectangular in shape.

8. A disc drive assembly as in claim 4 wherein said indentations disposed in said top surfaces with interior facing openings are offset from said indentations with interior facing openings in said bottom surfaces.

9. A disc drive assembly as in claim 1 wherein said flanges have substantially the same thickness as said motor coil bobbin.

10. A disc drive assembly as in claim 1 wherein said molded piece has substantially the same thickness as said motor coil bobbin.

11. A disc drive assembly as claimed in claim 10 wherein said actuator arm supports a transducer on an end distal from the end region supporting said coil portion, wherein rotation of said arm about a pivot positions said transducer over a rotating disc in said disc drive assembly.

12. A disc drive assembly as in claim 1 wherein said molded piece is thermoplastic resin.

13. A disc drive assembly as in claim 1 wherein said molded piece is a thermoplastic resin which is 15 percent glass filled.

14. A disc drive assembly as in claim 1 further comprising:

a stopping means for restricting said actuator arm motion upon installation in said disc drive assembly.

15. A disc drive assembly as in claim 14 wherein said stopping means comprises a first finger and a second finger, said first finger and second finger located above and to the outside of said motor coil bobbin, said first and second fingers for restricting said actuator arm motion upon installation in said disc drive assembly.

16. A disc drive assembly as in claim 14 further comprising:

a latching means for fixably parking said actuator arm in said disc drive assembly.

17. A disc drive assembly as claimed in claim 16 wherein said latching means comprises a C-shaped metal magnetic latch striking plate, said magnetic latch striking plate disposed on a finger.

18. In a disc drive having a casing surrounding a spindle motor assembly and at least one disc supported by said spindle motor assembly for rotation within said casing, an actuator arm supporting a coil portion of a magnetic voice coil motor at one end of said arm, and a transducer at the other end of said arm for selective placement over a track on said disc for reading and writing information on said track, and motor control electronics including a printed circuit cable for passing control signals to and from said coil portion, said one end of said actuator arm for supporting said coil portion comprising complementary flanges defining a space there between wherein said coil portion is located, a method of fixing and establishing an interface for said coil portion in place on said actuator arm comprising the steps of:

winding said coil portion in a desired shape for said coil portion, defining input and output lead wires that extend away from said coil portion, placing tubes of insulating and reinforcing material over each of said input and output lead wires located closely adjacent to said coil portion, molding said coil portion in said shape and attaching said coil portion to said actuator arm by placing a molding material over said coil portion, wherein said coil portion is enclosed in a mold which is closed over said coil portion and said lead wires whereby the lead wires are fixed in place with the robes of insulating and reinforcing material to allow for direct connection between said coil portion input and output lead wires and said printed circuit cable, to protect said lead wires from pressure by said mold during the forming of said molded coil and during post-molding operations, to insulate said input and output lead wires from each other, and to minimize the height of the disc drive, and directly connecting said individually protected input and output lead wires to said printed circuit cable.

19. The method as in claim 18 for fixing said coil portion in said disc drive wherein said complementary flanges of said actuator arm have at least one hole extending there through, so that said coil molding step incorporates the step of causing said molding material to flow into said at least one hole in said flanges to form at least one pin and to permanently fasten said molded coil portion to said actuator arm as an integral part thereof.

20. In a disc drive having a spindle motor assembly, an actuator arm supported for rotation by a pivot assembly, and motor control electronics including a printed circuit cable, said actuator arm having a rear forked portion including first and second forked fingers for supporting a coil portion of a magnetic voice coil motor between said fingers and said actuator arm supporting a transducer for selective placement over a track on a disc for reading and writing information on said disc track, said coil portion comprising:

a single wire wound in a prescribed shape and having input and output leads extending away from said coil portion; and individual tubes of insulating and reinforcing material over each of said input and output leads in regions extending from closely adjacent said coil portion and overlying a surface of said rear forked portion and near to said pivot assembly, said individual tubes allowing for direct connections between said coil portion input and output leads and said printed circuit cable, to protect said input and output leads from unnecessary flexing during assembly molding of said actuator arm, to insulate said input and output leads from each other, and to minimize the height of the disc drive.

21. A disc drive as claimed in claim 20 wherein said actuator arm further comprises a molded piece surrounding and supporting said coil portion in a defined shape, said molding piece attaching said coil portion to said rear forked portion of said actuator arm between said first and second forked fingers of said actuator arm to hold said coil portion in place, said molded piece extending at least partially over said insulating and reinforcing tubes for said input and output leads , and wherein said molded piece includes first and second upright pins extending through openings in said first and second fingers of said rear portion of said actuator arm to attach said molded piece to said actuator arm in a fashion allowing removal thereof by cutting said pins.

22. In a disc drive having a casing surrounding a spindle motor assembly and at least one disc supported by said spindle motor assembly for rotation within said casing, an actuator arm supporting a coil portion of a magnetic voice coil motor at one end of said arm, and a transducer at the other end of said arm for selective placement over a track on said disc for reading and writing information on said track, and motor control electronics including a printed circuit cable for passing control signals to and from said coil portion, said one end of said actuator arm for supporting said coil portion comprising first and second legs defining a space there between wherein said coil portion is located, a method of fixing and establishing an interface for said coil portion in place on said actuator arm comprising the steps of:

winding said coil portion in a desired shape for said coil portion, defining input and output lead wires that extend away from said coil portion, placing tubes of insulation and reinforcing material over each of said input and output lead wires located closely adjacent to said coil portion, molding said coil portion in said shape and attaching said coil portion to said arm by placing a molding material over said coil portion, wherein said first and second legs of said actuator arm have at least one hole extending there through, so that said coil portion molding step incorporates the step of causing said molding material to flow into said at least one hole in said legs to form at least one pin and to permanently fasten said molded coil portion to said actuator arm as an integral part thereof, wherein said coil portion is enclosed in a mold which is closed over said coil portion and said lead wires whereby the lead wires are fixed in place with the tubes of insulating and reinforcing material to allow for direct connection between said coil portion input and output lead wires and said printed circuit cable, to protect said lead wires from pressure by said mold during the forming of said molded coil, to insulate said input and output lead wires from each other, and to minimize the height of the disc drive, and directly connecting said individually protected input and output lead wires to said printed circuit cable.

23. In a disc drive having a spindle motor assembly for supporting a disc for rotation, an actuator arm, and motor control electronics including a printed circuit cable, said actuator arm having a rear forked portion including first and second forked fingers for supporting a coil portion of a magnetic voice coil motor at one end thereof, and a second portion supporting a transducer for selective placement over a track on said disc in response to actuation of said voice coil motor for reading and writing information on said disc track, said coil portion comprising:

a single wire wound in a prescribed shape and having input and output leads extending away from said coil portion; and individual tubes of insulating and reinforcing material over each of said input and output leads in regions extending from closely adjacent said coil portion over said rear forked portion of said arm, said individual tubes to allow for direct connections between said coil portion input and output leads and said printed circuit cable, to protect said input and output leads from unnecessary flexing during testing and molding of said actuator arm, to insulate said input and output leads from each other, and to minimize the height of the disc drive; and said actuator arm further comprising a plastic mold surrounding and supporting said coil portion in a defined shape, said mold attaching said coil portion to said rear forked portion of said actuator arm between said first and second forked fingers of said actuator arm to hold said coil portion in place, said mold extending at least partially over said insulating and reinforcing tubes for said input and output leads, and wherein said mold includes first and second upright pins extending through openings in said first and second fingers of said rear portion of said actuator arm to attach said molded piece to said actuator arm in a fashion allowing removal thereof by cutting said pins.

* * * * *